E. WHALLEY.
TRUCK.
APPLICATION FILED FEB. 26, 1915.
1,194,104.
Patented Aug. 8, 1916.
2 SHEETS—SHEET 1.
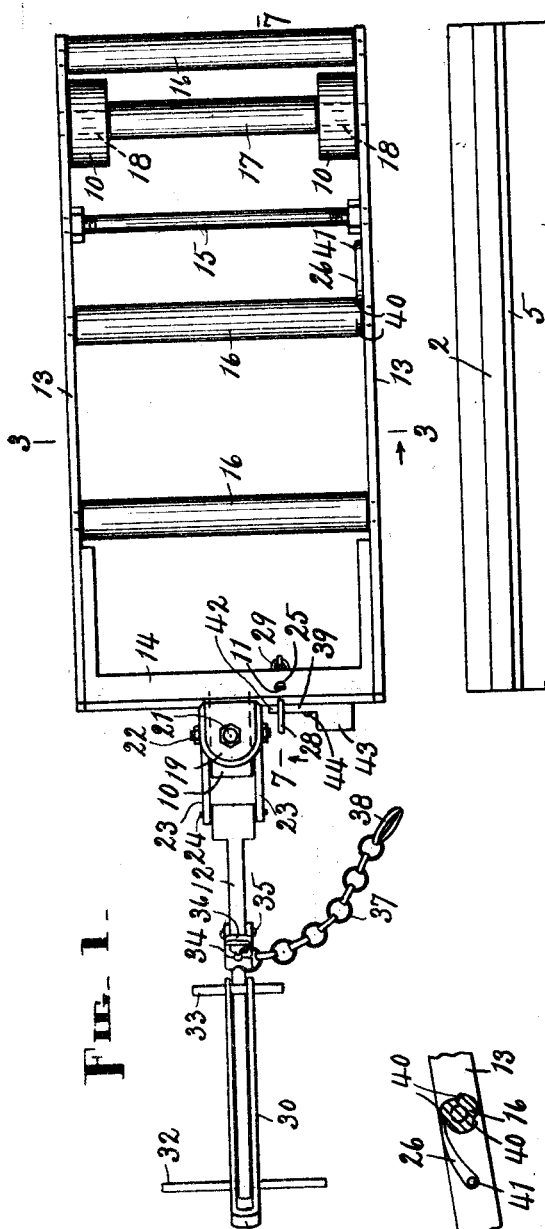
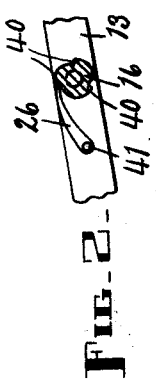
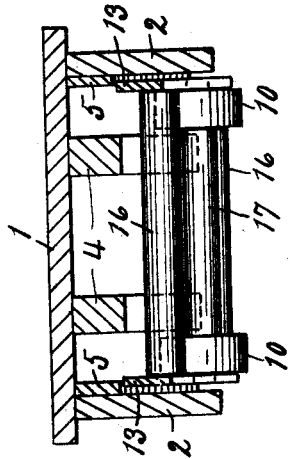
WITNESSES:
T. C. Fairbanks
H. D. Cutter.
INVENTOR.
Enoch Whalley,
BY
Webster & Co.,
ATTORNEYS.

E. WHALLEY.
TRUCK.
APPLICATION FILED FEB. 26, 1915.
1,194,104.
Patented Aug. 8, 1916.
2 SHEETS—SHEET 2.
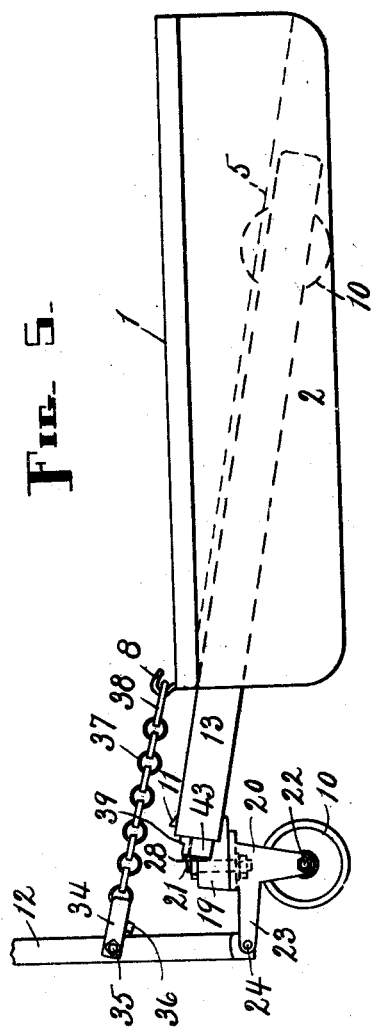
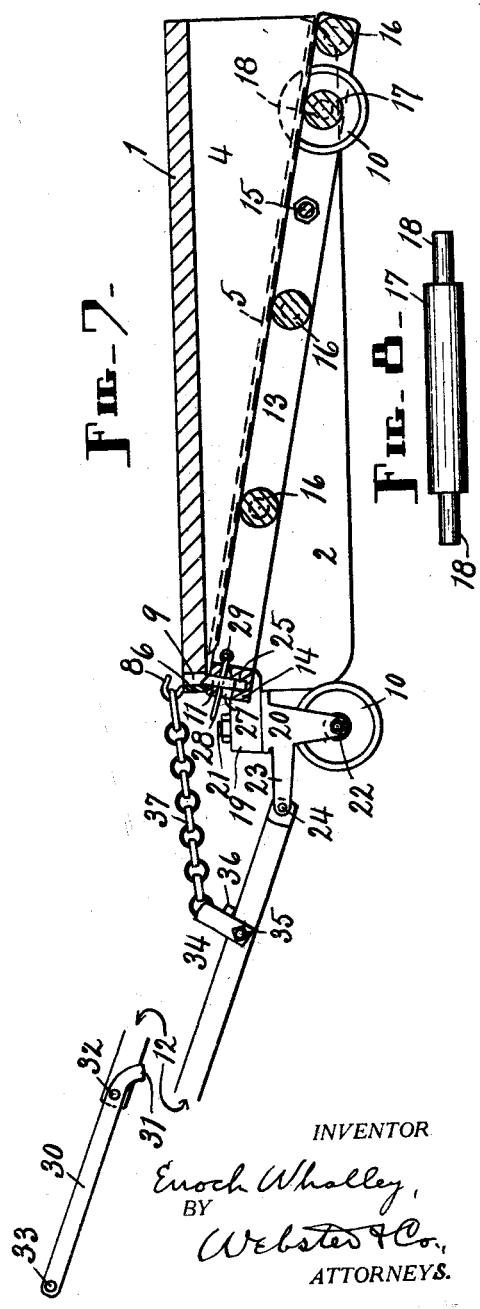
WITNESSES:
A. C. Fairbanks.
H. G. Cutter
INVENTOR
Enoch Whalley,
BY Webster & Co.,
ATTORNEYS.

UNITED STATES PATENT OFFICE.

ENOCH WHALLEY, OF WILLIMANSETT, MASSACHUSETTS.

TRUCK.

1,194,104.     Specification of Letters Patent.     Patented Aug. 8, 1916.

Application filed February 26, 1915. Serial No. 10,700.

*To all whom it may concern:*

Be it known that I, ENOCH WHALLEY, a citizen of the United States of America, residing at Willimansett, in the county of Hampden and State of Massachusetts, have invented a new and useful Truck, of which the following is a specification.

My invention relates to improvements in trucks, for use in factories, warehouses, stores, and other places to haul goods or materials from point to point, and commonly known as elevating trucks, and said invention consists in general of a certain peculiar carriage and a certain peculiar bench or platform, the latter although adapted to coact or coöperate with said carriage being an entirely independent element complete and serviceable in and of itself, together with such mechanical parts or mechanism as may be needed to make the truck operative and render the same practical and efficient, all as hereinafter set forth. The ordinary truck of this type consists of permanently connected reciprocable sections arranged so that one section is adapted to be raised and lowered on the other section, and a bench or platform is provided for the load to support the latter above the floor and leave room for the truck to be backed under the platform with its load before elevating the same and to be withdrawn after the platform with its load is lowered, and the principal object of my invention is to dispense with one of the aforesaid sections and utilize the bench or platform as a part of the truck, thereby reducing the number of parts and the expense of construction, producing a very low truck, which obviously is a valuable and desirable feature, and generally simplifying the apparatus in both structure and operation, all without detracting in any way from the utility of such apparatus, but on the contrary enhancing its usefulness and practicability.

A further object of my invention is to produce a truck with a separable carriage which can be easily and quickly operated to raise and lower the load, and readily drawn or pushed about in any direction, either when loaded or unloaded.

Still another object is to provide the truck with adequate controlling means for the load, including automatic breaking means and automatic locking and unlocking means. These automatic means, although not necessary to the success of the truck, are very desirable features and add to the value and efficiency of said truck in many if not most cases.

I am enabled in this truck to employ an equalizing factor by means of which the raising of the load is performed, and the lowering of the load may be performed if necessary or desired, under conditions which require the putting forth, on the part of the operator, of an approximately uniform amount of force, from start to finish, the load in being elevated starting slowly and with the minimum expenditure of force, and then, as said load continues to rise, the force being in part absorbed in increased speed, such minimum expenditure thus continuing, and, inversely, the same thing being true or a similar action taking place when the load is lowered, provided it be expedient to lower by hand or manually to control the lowering operation. Provision may also be made for supplementary or auxiliary leverage, for the handling by the truck of loads of unusual weight.

This truck is very powerful and capable of handling a great weight.

Other objects and advantages will appear in the course of the following description.

A preferred form of embodiment of the invention, whereby I attain the objects and secure the advantages of the same, is illustrated in the accompanying drawings, and I will proceed to describe the invention with reference to said drawings, although it is to be understood that the form, construction, arrangement, etc., of the parts in various aspects are not material and may be modified without departure from the spirit of the invention.

In the drawings, in which like numerals designate like parts throughout the several views, Figure 1 is a top plan of the carriage of a truck which embodies my invention as aforesaid; Fig. 2, a fragmentary detail of the automatic drag or brake feature; Fig. 3, a cross-section through such truck, taken through said carriage on lines 3—3, looking in the direction of the associated arrow, in Fig. 1; Fig. 4, a bottom plan of the platform of such truck; Fig. 5, a side elevation of such truck, showing the carriage and the elevating parts in position ready to elevate the platform; Fig. 6, a fragmentary detail illustrating the automatic unlocking feature; Fig. 7, a longitudinal vertical section through such truck, taken through the carriage on lines 7—7, looking in the direction of the associated arrow, in Fig. 1, the platform being in raised position, and, Fig. 8, an elevation of one of the rollers with its trunnions.

The front end portion of the tongue or handle of the truck is broken off in Fig. 5, and in Fig. 7 such terminal portion is broken off, but shown in proximity to the other portion of such handle, for obvious reasons. In the first view the handle extension is shown in inoperative position, while in Fig. 7 said extension is shown in operative position.

This truck comprises a floor bench or platform upon which the load rests at all times, such platform being provided underneath with one or more wedges which incline downwardly from front to rear, and a carriage provided with supporting members arranged on an incline for said wedges and platform, the plane of inclination of said supporting members being directed downwardly and rearwardly.

The truck also comprises means for moving the platform onto the carriage and securing the same thereon, and for releasing said platform and permitting it to move down onto the floor. In practice the carriage may be forced rearwardly under the loaded platform during the elevating operation, and forced forwardly and partly from beneath said platform during the lowering operation, or there may in either case be a combination of movements, that is, both the carriage and platform may move longitudinally, but ordinarily it is the platform that moves longitudinally or horizontally as well as vertically, when said platform is not loaded, wherefore this is a correct view to take of the operation of the unloaded truck.

The truck illustrated in the drawings is described as follows:

At 1 is represented a platform provided with ordinary side pieces 2, or equivalent members which are designed to rest directly on the floor and to support said platform with its load at the proper distance above the floor. On the underside of the platform 1 are two wedges 4, although there may be more or less than that number. The wedges 4 extend lengthwise of the platform 1 and incline downwardly from their front ends to their rear ends, as clearly shown in Fig. 7. The wedges 4 are spaced from the side pieces or supports 2, as well as from each other. On the underside of or beneath the platform 1 and against the inner faces of the supports 2 is a pair of inclined ribs or shoulders 5. The shoulders 5 are parallel with the wedges 4, and the inclination or pitch of the undersides or edges of all of these members is of the same degree, but the inclined plane of the shoulders is located slightly above that of the wedges. The platform and its members thus far described may be made of wood.

Secured to the front end of the platform 1 is a plate 6 which has a hook 8 rising therefrom in the longitudinal center of said platform. A slot 9 is cut in the platform 1 behind the plate 6 and a little to one side of the aforesaid longitudinal center.

The carriage, for the platform 1, comprises a suitable frame mounted on a plurality of wheels 10 and equipped with a plurality of transverse platform supports, the arrangement being such that said supports are on a plane which inclines downwardly from the foremost support to the rearmost support at an angle corresponding to the angle of inclination of the wedges 4, and said carriage is provided with a latch 11 to enter the slot 9 when the platform is in its high position, and with a tongue or handle 12 and means to connect said handle with the platform hook 8, and equipped with a detent 26 and a trip 39. The frame of the carriage here consists of two side pieces 13, a cross piece or head 14 connecting the front terminals of said side pieces, and a tie-rod 15 connecting said side pieces between their rear ends and centers. The width of the frame is such as to enable said frame to be introduced between the floor supports 2 of the platform 1, said supports serving to guide said frame or the carriage into place under said platform, and to prevent the latter from being displaced laterally while on said carriage.

The platform supports previously alluded to should be of the anti-friction type, and in this case consist of three rotatable members or rollers 16 and a fourth rotatable member or roller 17 which is shorter than the other three. All of said rollers have trunnions which are journaled in the side pieces 13. The trunnions of the roller 17 are indicated by dotted lines at 18 in Fig. 1, and shown in full in Fig. 8, and two of the wheels 10 are mounted on said trunnions between said roller and the side-pieces 13. One of the rollers 16 is behind the roller 17, and the other two rollers 16 are in front or ahead of said roller 17. The latter is long enough to accommodate the two wedges 4, and to separate the wheels 10 on the trunnions 18 far enough so that they can not be interefered with by said wedges.

The carriage may be equipped with means of control for one or more of the rollers so that each of such rollers is prevented from rotating backward and is thus caused to serve as a drag under the platform 1 when the latter descends. To this end the roller 16, which is in front of the tie-rod 15, has one or more ratchet teeth 19 cut therein at one end, and the detent 26, which has its rear end pivoted at 41 behind said roller to the side piece 13 that is contiguous to said teeth, extends forward into engagement with such teeth, the arrangement being such that said roller is permitted to revolve freely in a forwardly direction, but is prevented from revolving backward. The roller 16 having the teeth 40 offers no resistance to the platform 1 when the latter is drawn forward and upward; on the contrary it acts with the other rollers to facilitate such operation, but, when said platform moves rearward and downward and said tooth-provided roller commences to rotate backward, one of said teeth is caught by the detent 26 and said roller is locked against further reverse motion, with the result that the roller offers a certain amount of resistance to the platform, enough in fact, to prevent the platform from descending too quickly or without the application of pressure at the front end, according to the weight of the load.

Projecting forward from the center of the head 14 is a lug 19, and this rests on a swivel hanger 20 for the third or front wheel 10. The hanger 20 is of ordinary construction and pivoted at 21 to the lug 19. The front wheel 10 is mounted on a short shaft or rod 22 carried by the hanger 20. There are three wheels 10 in the present construction, and as a rule this number is sufficient, since the front wheel both supports the corresponding end of the truck and serves as the guiding or steering wheel therefor, and the two rear wheels support the back end of the track. The hanger 20 is of the proper height to give the frame and the rollers 16 and 17 the required inclination. A pair of arms 23 extend forward from the hanger 20, and the rear end of the handle 12 is pivoted at 24 to the front ends of said arms.

A recess 25 is made in the head 14 to receive the latch or bolt 11 and permit the head of said bolt to project above the top of said head 14. There is a passage 27 through the head 14 from front to back to accommodate a bolt-operating lever or arm 28, such arm having its rear end pivotally attached at 29 to the back side of said head, and projecting in front of said head after passing through said passage and the bolt 11. The trip 39 has an operating finger at one end to engage the arm 28, and a counterweight 43 at the other end, and said trip is pivoted at 44 against the front side of the head 14 between said arm and the adjacent end of said head. Where the trip 39 is so disposed on the pivot 44 that the counterweight 43 is at the outer end of said trip, the finger 42 is underneath the protruding front terminal of the arm 28, and said counterweight is exerting a tendency to raise said finger and arm, with the result that, through the medium of these parts, the bolt 11 is elevated into operative position and retained in such position, under normal conditions; and, when said trip is reversed on said pivot, said counterweight is brought into contact with the said arm from above and rests on the same, as indicated by dotted lines in Fig. 6. The counterweight is heavy enough to press down the arm 28 and so withdraw the bolt 11 from locking position, in the absence of a superior force applied to said bolt. Normally the trip 39 retains the bolt 11 in projected position, the head of said bolt then being in the path of the plate 6 or in position to contact therewith and in line with the slot 9, when the carriage is introduced beneath the platform 1, but, by pressing the front end of the arm 28 downward, said bolt is withdrawn by said arm from said projected position. Upon the release of the arm 28 the trip 39, if disposed with the finger 42 under said arm, acts to raise the latter and thrust the bolt 11 upwardly again into locking or engaging position, the upward rise of said bolt being limited by said arm and the top of the passage 27.

The handle 12 is provided with extensible or lengthening means, in order that the leverage and consequent power of the same may be increased when occasion demands. Such means here consists of an extension handle 30 in the form of a double-sided member to embrace the forward part of the handle 12, and which has a stirrup 31 at one end to engage said handle 12, and is pivoted at 32 to said handle 12 near the front end thereof, such pivot passing through said handle 30 a short distance from said stirrup. The pivot 32 is a rod which forms the cross-piece, -bar, or -rod of the handle 12, and there is a cross-rod 33 which passes through the free terminal portions or free ends of the aforesaid double-sided member. The cross-rod 33 forms a part of or is an adjunct to the handle 30. When the extension handle is not in use it is so turned on the pivot or rod 32 as to enable the cross-rod 33 to rest on the handle 12, as shown in Fig. 1, and when required for use said extension handle is swung over on said pivot into a forward position until the stirrup 31 comes into engagement with the underside of said handle 12, as shown in Fig. 7. When the auxiliary handle is in the last-noted position the length and efficiency of the tongue or handle as a whole are increased and augmented to a considerable extent.

An upwardly or rearwardly extending equalizer link 34 is pivoted at 35 to the handle 12 a short distance from the pivot 24, and said link has a transverse bar 36 arranged to come into contact with said handle, when said link is rocked rearwardly or downwardly, and thus to limit the movement of said link, on the pivot 35, toward the pivoted end of said handle. A member, in the form of a chain 37 having one end attached to the link 34 and provided at the other end with a ring 38 to engage the hook 8, is provided as the detachable connecting medium between the handle 12 and the platform 1. The arrangement and proportions of parts are such that the initial line of draft between the pivot 35 and the hook 8, when the chain 37 is connected therewith, is straight or direct, the bar 36 being then out of contact with the handle 12, as shown in Fig. 5, but the line of draft becomes indirect as said pivot is swung forwardly and downwardly and said bar contacts with said handle, as shown in Fig. 7. The change commences when the handle 12 encounters the bar 36, as said handle is swung downwardly and forwardly on the pivot 24, and so actuates the link 34 out of line with the chain 37, said link then fulcruming on the bar 36. At the beginning of the forwardly and downwardly swinging or lifting stroke of the handle 12, therefore, the draft is direct and most powerful, but the movement is very slow, as should be the case in order to start the platform forward and upward, on the rollers 16 and 17, then, as said handle contacts with said bar and causes the link 34 to describe at the chain end an arc of a circle, the movement is accelerated in compensation for the decrease in lifting or propelling force required to carry said platform to its high position after being started. The same rule applies to the lowering of the load, only inversely, in the event the handle 12 be employed to control the action of the load in descending. The advantage of the provision, whereby is obtained in this truck the straight or approximately straight initial draft which changes to an indirect or angular draft, is clearly apparent, since more power is required to start the load forward and upward than to complete the operation.

The shoulders 5 are so situated as to be over the side pieces 13, just clearing the same, when the platfrom 1 is elevated on the carriage, consequently they prevent said platform with its load from tipping over on either side and from rocking laterally. The load not infrequently is or becomes laterally overbalanced or has a tendency to vibrate or oscillate in such a manner as to shift its base laterally, and in any such event the shoulder 5 on the overbalanced side immediately comes to rest on the side piece 13 below and thus supports the platform and load on that side, as just intimated, even the slightest tendency to tilt sidewise being almost instantly overcome by this means and in this manner. Of course, there is no rocking movement as long as the wedges 4 rest squarely on their supporting rollers 16 and 17, and the supports 2 always prevent lateral displacement on the inclined plane of the truck, such displacement being distinguished from the tilting or rocking motion to which reference has been made.

The operation of the truck as a whole is described as follows: The carriage is first backed under the platform 1 until brought to a stop by the rollers 16 and 17 coming into contact with the wedges 4, when the handle 12 is swung upward on the pivot 24 into an approximately vertical position and the ring 38 is thrown over the hook 8; then said handle is forced down again with the result that said platform, with its load, through the medium of the link 34, the chain 37 and said hook, is drawn forward and upward on said carriage, said wedges riding on said rollers, until the supports 2 are well above the floor, when the plate 6 crowds by the latch 11, which is held up by the arm 28 and the trip finger 42, and said latch snaps into the slot 9; the pressure on said handle is now discontinued and said platform left in engagement with said latch, the latter holding the former securely so that it can not slide down on the carriage; next the truck is hauled to any desired point, by means of said handle which can at this time be manipulated freely whether or not said chain be discontinued from said hook, and the arm 28 is actuated to withdraw said latch from said slot and so to permit said platform to move rearwardly and downwardly on said carriage, said wedges riding on said rollers as before, until said supports once more come to rest on the floor; and, finally, the carriage is withdrawn from the platform, leaving the same with the load standing as just placed. If the arm 28 be operated with the foot or by hand to withdraw the bolt 11 to release the platform, either the ring 38 should be removed from the hook 8, or the handle 12 should be grasped. If the chain 37 be left connected with the hook 8, the lowering of the platform and load can be controlled easily by means of the handle; usually, however, the platform and load may be permitted to slide off the carriage without manual control, and when the detent 26 is employed even a slight pressure applied to the front of the load may be needed to cause the load to descend. As just observed the arm 28 may be operated by means of the foot, or even by the hand to unlatch the platform, but generally, after the platform is elevated, the trip 39 is reversed to locate the counterweight 43 on said arm, and said platform is unlatched or unlocked by bearing down on the handle 12, which must at the time be connected with the hook 8, to draw said platform slightly forward, when said counterweight causes the latch 11 to be drawn out of the slot 9. In this way the platform is automatically unlocked, and after being so unlocked said platform is lowered in the manner previously explained. Before the platform is again raised on the carriage, the trip 39 should be turned over so as to locate the finger 42 under the arm 28 and cause the head of the latch 11 to be again projected into the path of the plate 6.

The angle of inclination of the parts must not be so great as to call for the expenditure of an excessive amount of force in order to elevate the load, or to cause the load to descend too rapidly and with too great a shock, although this latter can be avoided by providing whatever locking appliances may be required for the rollers, or exercising control by means of the handle 12 and the connecting members between said handle and the platform.

Owing to the fact that the rear wheels 10 are mounted on the trunnions 18 of the roller 17, the platform in being actuated forward rotates said roller in the opposite direction to that which said wheels would naturally have a tendency to take during the elevating operation, and said wheels are consequently given a tendency in the other direction, which is a factor in assisting to cause the carriage to remain stationary during said elevating operation, and, conversely, the same condition prevails during the lowering operation, so that the carriage is not shot forward as it were by the descending load. Nevertheless, in many cases the carriage moves horizontally rather than the platform and load, during both the elevating and lowering operations, but the desired results are obtained just the same as though the carriage were always immovable during such operations.

It is conceivable that, in some cases and for some purposes, the floor supports 2 might be omitted and the platform used in connection with supports which were permanently located on the floor at different points where it is desired to place the platform.

What I claim as my invention, and desire to secure by Letters Patent, is—

1. The combination, in a truck, of a separate floor platform provided with an intermediate wedge, a carriage adapted for temporary engagement with said platform, such carriage being provided with wedge-receiving supports arranged on an inclined plane, and normally unsupported by said carriage, actuating means connected with said carriage and adapted to be temporarily connected with said platform, whereby the latter may be drawn forward onto the former and thus raised from the floor, and lateral means of support for said platform when overbalanced, such lateral means of support being outside of and inclined to correspond with said wedge.

2. The combination, in a truck, with a separate floor platform provided with underneath shoulders at the sides and an intermediate wedge, such shoulders having a pitch to correspond to that of said wedge, of a carriage adapted for temporary engagement with said platform, said carriage comprising a frame provided with wedge-receiving supports, such frame with said supports being inclined to correspond to the inclination of said shoulders and wedge, and actuating means connected with said carriage and adapted to be temporarily connected with said platform, wherewith the latter may be raised onto the former, said shoulders being over the sides of said frame when the latter is beneath said platform.

3. The combination, in a truck, with a separate floor platform having a wedge intermediate and parallel with its longitudinal edges, of a plurality of wheels, a frame mounted at an incline on said wheels, a plurality of wedge-receiving revoluble supports mounted in said frame and extending between the sides thereof, the axes of said supports being fixed, and actuating means connected with said frame and adapted to be temporarily connected with said platform, the two latter being relatively longitudinally movable.

4. The combination, in a truck, with a wedge-provided platform, of a frame provided with plurality of rollers, the axes of said rollers being fixed, and one of such rollers having trunnions journaled in said frame, wheels mounted on said trunnions, a swivel support at the front end of said frame, a wheel carrying said support and with the latter retaining said frame in an inclined position with the front end higher than the back end, a handle pivotally attached to said support, and detachable connecting means between said handle and said platform.

5. The combination, in a truck, with a separate platform having floor supports adapted normally to rest on the floor, and provided underneath with lateral shoulders and an intermediate wedge, the bottom edges of said shoulders being inclined similarly to the wedge incline, of a carriage adapted for temporary engagement with said platform, said carriage consisting in part of an inclined frame receivable beneath said shoulders and provided with supporting members for said wedge, and actuating means connected with said carriage and adapted to be temporarily connected with said platform, whereby the latter may be raised onto the former.

6. The combination, in a truck, with a separate floor platform, having a wedge intermediate of and parallel with its longitudinal edges, of a carriage adapted for temporary engagement with said platform, said carriage consisting in part of a frame which is upwardly tilted at the front end and inclined downwardly and rearwardly therefrom to the back end, wedge-receiving revoluble supports in said frame between the sides thereof and carried by such sides in an inclined plane, the axes of such supports being fixed, and actuating means connected with said carriage and adapted to be temporarily connected with said platform, whereby the latter may be drawn forward onto the former and thus raised from the floor.

7. The combination, in a truck, with wedge-provided platform, of a carriage provided with wedge-receiving rotary supports arranged on an inclined plane, means to convert one of such supports into controlling means for said platform when descending, and actuating means for said platform and carriage.

8. The combination, in a truck, with a wedge-provided platform, of a carriage provided with wedge-receiving rotary supports arranged on an inclined plane, means to prevent one of such supports from rotating except in one direction, and actuating means for said platform and carriage.

9. The combination, in a truck, with a wedge-provided platform, of a carriage consisting in part of a frame and a plurality of rollers arranged at an incline, one of such rollers being provided with teeth, a detent pivotally attached to said frame and adapted to engage said teeth and prevent rotation of the tooth-provided roller except in one direction, and actuating means for said platform and carriage.

ENOCH WHALLEY.

Witnesses:
F. A. CUTTER,
A. C. FAIRBANKS.